United States Patent
Song

(10) Patent No.: US 10,922,677 B2
(45) Date of Patent: Feb. 16, 2021

(54) SERVICE IMPLEMENTATION USING A GRAPHIC CODE INCLUDING A BIOMETRIC IDENTIFIER

(71) Applicant: Advanced New Technologies Co., Ltd., Grand Cayman (KY)

(72) Inventor: Yitao Song, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/395,961

(22) Filed: Apr. 26, 2019

(65) Prior Publication Data

US 2019/0251570 A1      Aug. 15, 2019

Related U.S. Application Data

(63) Continuation of application No. PCT/CN2017/106669, filed on Oct. 18, 2017.

(30) Foreign Application Priority Data

Oct. 28, 2016  (CN) .......................... 2016 1 0971913

(51) Int. Cl.
*G06Q 20/40*   (2012.01)
*G06Q 20/32*   (2012.01)
(Continued)

(52) U.S. Cl.
CPC ..... *G06Q 20/3276* (2013.01); *G06K 7/10257* (2013.01); *G06K 19/07758* (2013.01);
(Continued)

(58) Field of Classification Search
None
See application file for complete search history.

(56) References Cited

U.S. PATENT DOCUMENTS 7,481,360 B1 *  1/2009  Ramachandran ...... G06Q 20/18
                                                            235/379
7,946,477 B1 *  5/2011  Ramachandran ..... G07F 19/205
                                                            235/379
(Continued)

FOREIGN PATENT DOCUMENTS

CN      102842081       12/2012
CN      103310335        9/2013
(Continued)

OTHER PUBLICATIONS

N. Aqili, A. M. (2016). Fingerprint Matching Algorithm based on Discrete to Continuous Approach. Rabat, Morocco: IEEE. Retrieved from IEEE: https://ieeexplore.ieee.org/stamp/stamp.jsp?tp=&arnumber=7519632 (Year: 2016).*

(Continued)

Primary Examiner — El Mehdi Oussir
(74) Attorney, Agent, or Firm — Fish & Richardson P.C.

(57) ABSTRACT

A display instruction associated with a graphic code is received from a terminal device and at a client computing device. A biometric feature identifier associated with a biometric feature that is verified by a server is obtained by the client computing device. A code string that includes the biometric feature identifier is generated by the client computing device. The graphic code that includes the code string is displayed at the client computing device, to permit completion of a service by the terminal device using the graphic code.

15 Claims, 11 Drawing Sheets

(51) Int. Cl.
*H04L 29/06* (2006.01)
*G06K 19/077* (2006.01)
*G06K 7/10* (2006.01)

(52) U.S. Cl.
CPC ... *G06Q 20/40145* (2013.01); *H04L 63/0807* (2013.01); *H04L 63/0861* (2013.01)

(56) References Cited

U.S. PATENT DOCUMENTS

| | | | | |
|---|---|---|---|---|
| 8,069,115 | B2* | 11/2011 | Schoenberg | G06Q 20/14 705/40 |
| 8,838,983 | B2* | 9/2014 | Sharma | G06F 21/64 713/176 |
| 9,563,761 | B1* | 2/2017 | Ziraknejad | H04L 63/0861 |
| 10,270,774 | B1* | 4/2019 | Berman | H04W 12/06 |
| 2004/0024709 | A1* | 2/2004 | Yu | G06Q 20/105 705/43 |
| 2004/0199387 | A1* | 10/2004 | Wang | G10L 17/26 704/243 |
| 2006/0124726 | A1 | 6/2006 | Kotovich et al. | |
| 2006/0131389 | A1* | 6/2006 | Kwon | G07D 7/004 235/380 |
| 2010/0229045 | A1* | 9/2010 | Schultz | G06F 8/60 714/37 |
| 2011/0119376 | A1* | 5/2011 | Bardsley | H04L 63/0861 709/224 |
| 2012/0078782 | A1* | 3/2012 | Schoenberg | G06Q 20/102 705/40 |
| 2012/0138679 | A1* | 6/2012 | Doyle | G06K 19/06037 235/380 |
| 2013/0013499 | A1* | 1/2013 | Kalgi | G06Q 20/12 705/41 |
| 2013/0185210 | A1* | 7/2013 | Dodson | H04L 63/0853 705/44 |
| 2013/0198078 | A1* | 8/2013 | Kirsch | G06Q 20/4014 705/44 |
| 2013/0278622 | A1* | 10/2013 | Sun | G06O 20/3276 345/589 |
| 2014/0052799 | A1* | 2/2014 | Keane | H04L 51/28 709/206 |
| 2014/0123253 | A1* | 5/2014 | Davis | G06F 21/316 726/6 |
| 2014/0363058 | A1* | 12/2014 | Emmett | G06F 21/32 382/117 |
| 2014/0372308 | A1* | 12/2014 | Sheets | G06Q 20/3674 705/44 |
| 2015/0088674 | A1* | 3/2015 | Flurscheim | G06Q 20/3274 705/17 |
| 2016/0042032 | A1* | 2/2016 | Rosati | G06Q 30/0185 235/375 |
| 2016/0072802 | A1* | 3/2016 | Hoyos | G06F 16/9535 726/5 |
| 2016/0078335 | A1 | 3/2016 | Annamalai et al. | |
| 2016/0094548 | A1 | 3/2016 | Lee et al. | |
| 2016/0212126 | A1 | 7/2016 | Sadacharam et al. | |
| 2016/0241402 | A1* | 8/2016 | Gordon | H04L 9/3231 |
| 2017/0024733 | A1* | 1/2017 | Purves | G06Q 20/20 |
| 2017/0213022 | A1* | 7/2017 | Potash | G06F 21/10 |
| 2017/0339140 | A1* | 11/2017 | Sudduth | H04W 12/06 |
| 2018/0089755 | A1* | 3/2018 | Mendez | G06Q 40/02 |
| 2018/0145833 | A1* | 5/2018 | Lin | H04L 9/30 |
| 2018/0165439 | A1* | 6/2018 | Corcoran | G06K 9/00 |
| 2018/0165781 | A1* | 6/2018 | Rodriguez | G06Q 20/3821 |
| 2018/0176017 | A1* | 6/2018 | Rodriguez | H04L 63/0861 |
| 2018/0181964 | A1* | 6/2018 | Zagarese | G06Q 20/40145 |
| 2018/0268414 | A1* | 9/2018 | Chung | H04L 9/3239 |
| 2019/0020483 | A1* | 1/2019 | Meng | H04L 9/3247 |
| 2019/0034934 | A1* | 1/2019 | Trelin | G06K 9/00845 |
| 2020/0104855 | A1* | 4/2020 | Bruno | G06Q 20/40145 |
| 2020/0259825 | A1* | 8/2020 | Van Prooijen | H04L 63/0861 |

FOREIGN PATENT DOCUMENTS

| | | |
|---|---|---|
| CN | 103929402 | 7/2014 |
| CN | 103985036 | 8/2014 |
| CN | 103985038 | 8/2014 |
| CN | 104184589 | 12/2014 |
| CN | 104732388 | 6/2015 |
| CN | 105096107 | 11/2015 |
| CN | 105471888 | 4/2016 |
| CN | 105550877 | 5/2016 |
| CN | 105590199 | 5/2016 |
| CN | 105844471 | 8/2016 |
| CN | 205486535 | 8/2016 |
| CN | 107026836 | 8/2017 |
| JP | 2004030176 | 1/2004 |
| JP | 2004102883 | 4/2004 |
| JP | 2009020650 | 1/2009 |
| JP | 2010061318 | 3/2010 |
| JP | 2012022703 | 2/2012 |
| TW | M519775 | 4/2016 |
| WO | WO 2012079170 | 6/2012 |

OTHER PUBLICATIONS

Abdulrahman Alhothaily, A. A. (2017, 6 8). QuickCash: Secure Transfer Payment Systems. Retrieved from file:///C:/Users/eoussir/Downloads/sensors-17-01376.pdf (Year: 2017).*
International Preliminary Report on Patentability in International Application No. PCT/CN2017/106669, dated Apr. 30, 2019, 11 pages (with English translation).
International Search Report and Written Opinion in International Application No. PCT/CN2017/106669, dated Jan. 17, 2018, 14 pages (with English translation).
TenPay, WeChat Offline Payment, © 2005-2019, retrieved on May 25, 2019, URL <https://global.tenpay.com/products/offline_payment.shtml>, 1 page.
Extended European Search Report in European Application No. 17865961.1, dated Jul. 19, 2019, 8 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

\* cited by examiner

SERVICE IMPLEMENTATION USING A GRAPHIC CODE INCLUDING A BIOMETRIC IDENTIFIER

CROSS-REFERENCE TO RELATED APPLICATIONS

This application is a continuation of PCT Application No. PCT/CN2017/106669, filed on Oct. 18, 2017, which claims priority to Chinese Patent Application No. 201610971913.7, filed on Oct. 28, 2016, and each application is hereby incorporated by reference in its entirety.

TECHNICAL FIELD

The present application relates to the field of communications technologies, and in particular, to a method and an apparatus for service implementation.

BACKGROUND

With the rapid development of Internet technologies, the two-dimensional code is more widely used. Through two-dimensional code scanning, information can be exchanged to implement related services. In the existing technologies, usually the two-dimensional code carries necessary information used to complete related services, such as a user account and user information. Once an unauthorized person steals the two-dimensional code, information of an authorized user can be leaked, causing losses to the authorized user.

SUMMARY

In view of this, the present application provides a method and an apparatus for service implementation.

The present application is implemented by using the following technical solutions.

A method for service implementation is applied to a client and includes: after a display instruction of a graphic code is received, obtaining a biometric feature identifier of a biometric feature that has been verified; generating a code string that carries the biometric feature identifier; and displaying a graphic code that carries the code string, so after scanning the graphic code, another terminal device sends the code string to a server, and the server identifies a binding user account based on the biometric feature identifier to complete related services.

A method for service implementation is applied to a server and includes: receiving a code string sent by a client, where the code string is parsed out after a graphic code is scanned; parsing out a biometric feature identifier from the code string; searching for a user account binding to the biometric feature identifier; and completing related services based on the user account.

An apparatus for service implementation is applied to a client and includes: an identifier acquisition unit, configured to: after a display instruction of a graphic code is received, obtain a biometric feature identifier of a biometric feature that has been verified; a code string generation unit, configured to generate a code string that carries the biometric feature identifier; and a barcode displaying unit, configured to display a graphic code that carries the code string, so after scanning the graphic code, another terminal device sends the code string to a server, and the server identifies a binding user account based on the biometric feature identifier to complete related services.

An apparatus for service implementation is applied to a server and includes: a code string receiving unit, configured to receive a code string sent by a client, where the code string is parsed out after a graphic code is scanned; an identifier parsing unit, configured to parse out a biometric feature identifier from the code string; an account searching unit, configured to search for a user account binding to the biometric feature identifier; and a service implementation unit, configured to complete related services based on the user account.

It can be seen from the previous description that, in the present application, a biometric feature identifier can be bound to a user account on a server in advance. After receiving a display instruction of a graphic code, the client can display a graphic code that carries the biometric feature identifier. The server can search for the binding user account based on the biometric feature identifier to complete related services, and does not need to carry sensitive information such as a user account in the graphic code. Even if an unauthorized person steals a terminal device of the user, a service operation cannot be performed because the biometric feature does not match, thereby ensuring security of user information and property.

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent same or similar elements. Implementations described in the following example implementations do not represent all implementations consistent with the present application. Instead, they are only examples of apparatuses and methods consistent with some aspects of the present application that are described in detail in the appended claims.

The terms used in the present application are merely for illustrating specific implementations, and are not intended to limit the present application. The terms "a" and "the" of singular forms used in the present application and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. can be used in the present application to describe various types of information, the information is not limited to the terms. These terms are only used to differentiate information of a same type. For example, without departing from the scope of the present application, first information can also be referred to as second information, and similarly, the second information can be referred to as the first information. Depending on the context, for example, the word "if" used here can be explained as "while", "when", or "in response to determining".

Figure 1:
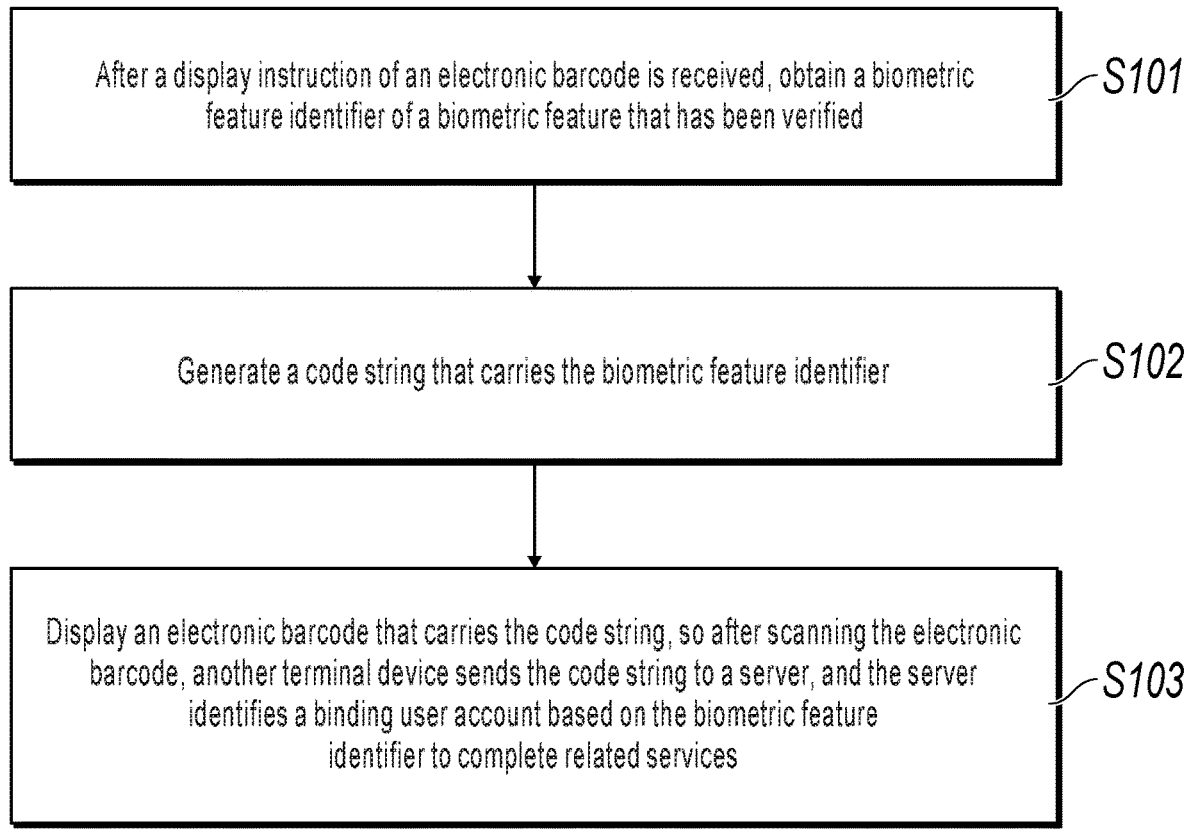
FIG. 1 is a schematic flowchart illustrating a method for service implementation, according to an example implementation of the present application.

FIG. 1 is a schematic flowchart illustrating a method for service implementation, according to an example implementation of the present application.

Referring to FIG. 1, the method for service implementation can be applied to a client and includes the following steps:

Step 101: After a display instruction of a graphic code is received, obtain a biometric feature identifier of a biometric feature that has been verified.

In this implementation, the graphic code can include a barcode and a two-dimensional code. In specific application scenarios, the graphic code can be a payment code, a collection code, etc.

In an example, after receiving the display instruction of the graphic code, the client can collect a biometric feature entered by a user, and after determining that the biometric feature is verified, a terminal system or a server can return a biometric feature identifier of the biometric feature to the client. The biometric feature can be a fingerprint, a palmprint, an iris, a sclera, a face, etc. When the biometric feature is a fingerprint, the biometric feature identifier is usually generated by the terminal system when an authorized user enters a biometric feature. For example, when the user enters a fingerprint used for unlocking, the terminal system can generate a fingerprint identifier for the fingerprint. If the biometric feature is an iris, a face, etc., the biometric feature identifier can be generated by the server when the authorized user enters a biometric feature used for identity authentication. For example, when the user enters a face image used to unlock an APP, the server generates a face image identifier for the face image entered by the user.

In another example, when an application (APP) that displays the graphic code needs to be unlocked before being enabled, the terminal system or the server can send the biometric feature identifier of the biometric feature to the client after determining that the biometric feature of the user is verified, and the client stores the biometric feature identifier. After receiving the display instruction of the graphic code, the client can obtain the stored biometric feature identifier.

Step 102: Generate a code string that carries the biometric feature identifier.

Step 103: Display a graphic code that carries the code string, so after scanning the graphic code, another terminal device sends the code string to a server, and the server identifies a binding user account based on the biometric feature identifier to complete related services.

In this implementation, after scanning the graphic code displayed on the client, other terminal devices can send the parsed code string to the server, and the server can search for the binding user account based on the biometric feature identifier in the code string, and complete related services based on the found user account.

Figure 2:
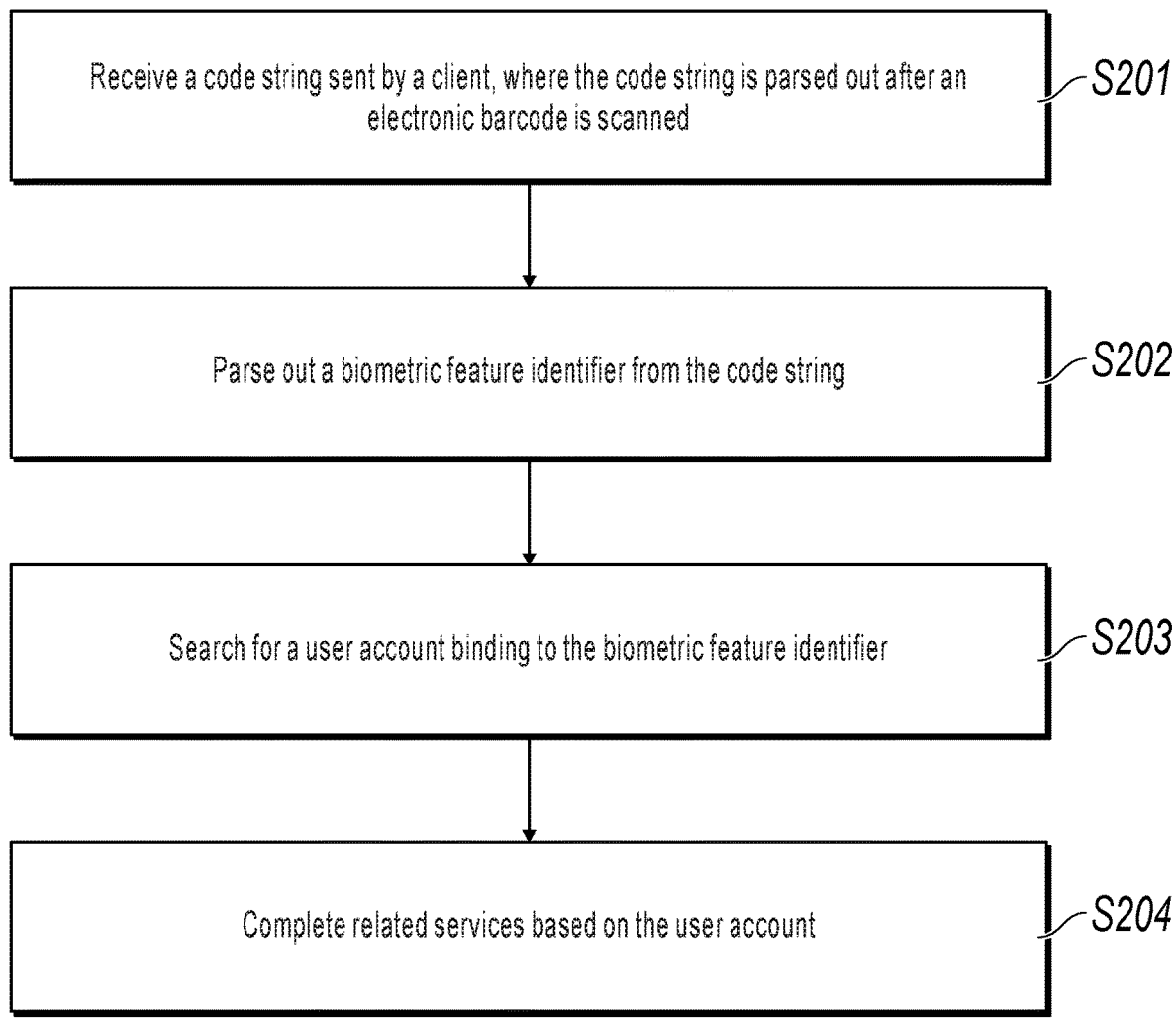
FIG. 2 is a schematic flowchart illustrating a method for service implementation, according to another example implementation of the present application.

FIG. 2 is a schematic flowchart illustrating another method for service implementation, according to an example implementation of the present application.

Referring to FIG. 2, the method for service implementation can be applied to a server and includes the following steps:

Step 201: Receive a code string sent by a client, where the code string is parsed out after a graphic code is scanned.

Step 202: Parse out a biometric feature identifier from the code string.

Step 203: Search for a user account binding to the biometric feature identifier.

In this implementation, after receiving a binding request of the client, the server can bind the biometric feature identifier carried in the binding request to the user account.

Step 204: Complete related services based on the user account.

It can be seen from the previous description that, in the present application, a biometric feature identifier can be bound to a user account on a server in advance. After receiving a display instruction of a graphic code, the client can display a graphic code that carries the biometric feature identifier. The server can search for the binding user account based on the biometric feature identifier to complete related services, and does not need to carry sensitive information such as a user account in the graphic code. Even if an unauthorized person steals the graphic code or a terminal device of a user, a service operation cannot be performed because the biometric feature does not match, thereby ensuring security of user information and property.

The following separately describes an implementation process of the present application from two aspects: user account binding and service implementation.

1. Binding the Biometric Feature Identifier to the User Account

Figure 3:
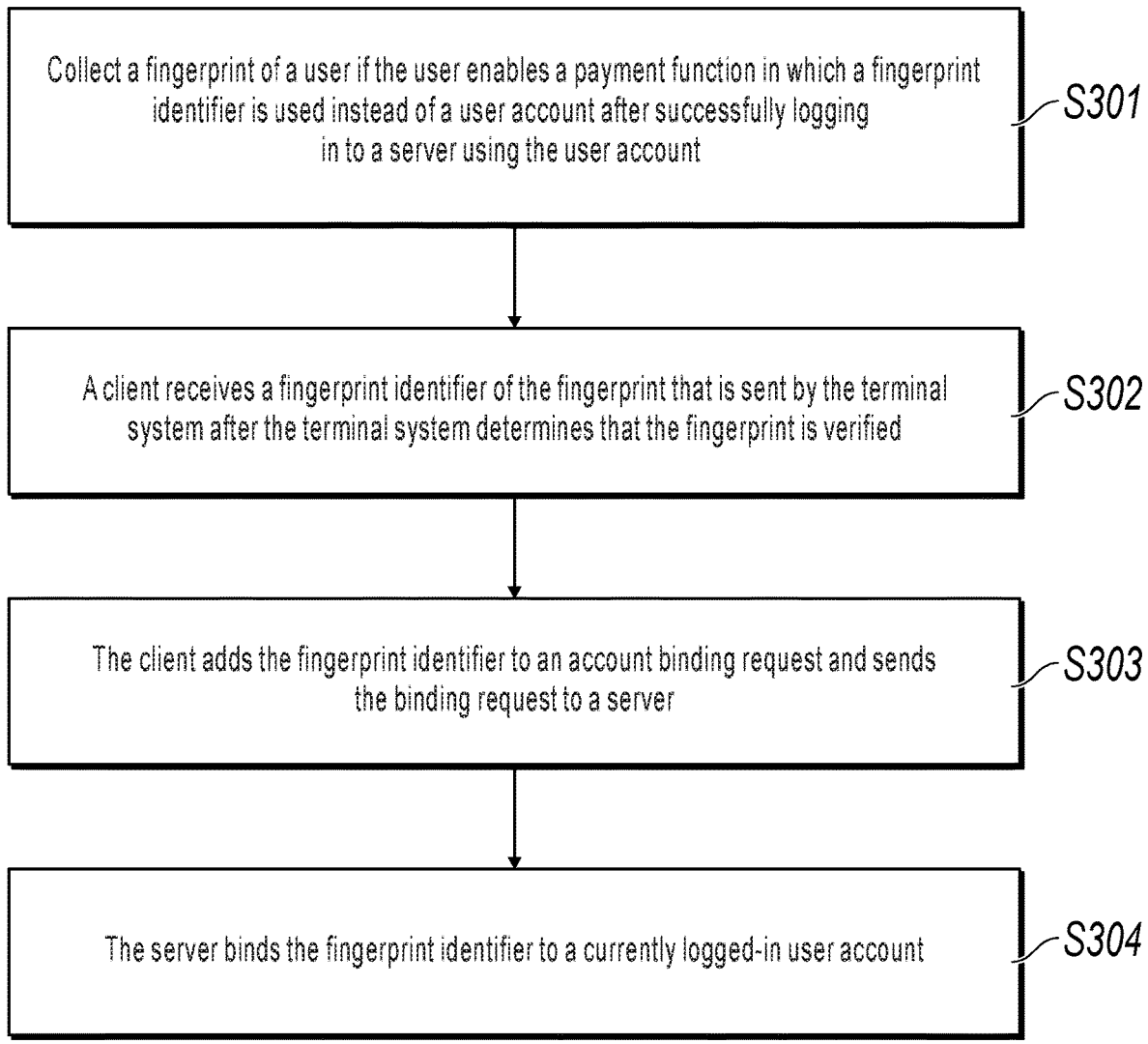
FIG. 3 is a schematic flowchart illustrating binding a biometric feature identifier to a user account, according to an example implementation of the present application.

Referring to FIG. 3, for example, a biometric feature is a fingerprint and a graphic code is a payment code. The fingerprint is stored in a terminal device, and a process of binding a biometric feature identifier to a user account on a server can include the following steps:

Step 301: After successfully logging in to a server using the user account, collect a fingerprint of a user if the user enables a payment function in which a fingerprint identifier is used instead of a user account.

In this implementation, the user can register the user account with the server in advance. Subsequently, related services can be implemented based on the registered user account. For a specific registration procedure, references can be made to the existing technologies, and details are omitted in the present application for simplicity.

In this implementation, the user can enter a login name and a password on the login page of the client to log in to the server, or the user can log in by using an SMS message authentication code. This is not specially limited in the present application.

In this implementation, after the user successfully logs in to the server, the user can enable a payment function of adding a fingerprint identifier to the payment code to replace the user account. In actual implementations, the client can provide the user with an enabling button of the function. After detecting that the user triggers the button, the client can invoke the terminal system to perform fingerprint verification on the user. The client can wake up a fingerprint sensor and prompt the user to perform fingerprint verification. After the fingerprint sensor collects the fingerprint of the user, the terminal system can verify the collected fingerprint to verify whether the fingerprint is a fingerprint of an authorized user stored in the system. When the collected fingerprint is a valid fingerprint, the terminal system can send the fingerprint identifier of the valid fingerprint to the client. If the collected fingerprint is not a valid fingerprint, the terminal system can return a verification failure notification to the client, and the client can further notify the user that the verification fails, or re-perform fingerprint verification.

The fingerprint identifier is generated by the terminal system when the authorized user enters the fingerprint. For example, the authorized user can enter a fingerprint on the terminal device to subsequently unlock the terminal device by using the fingerprint. After the user enters the fingerprint, the terminal device system can generate a fingerprint identifier for the fingerprint.

Step 302: A client receives a fingerprint identifier of the fingerprint that is sent by a terminal system after the terminal system determines that the fingerprint is verified.

Step 303: The client adds the fingerprint identifier to a binding request and sends the binding request to the server.

In this implementation, the binding request is used to request the server to bind a fingerprint identifier generated by the terminal system to a user account, so as to enable a payment function of adding the fingerprint identifier to a payment code to replace the user account.

Step 304: The server binds the fingerprint identifier to a currently logged-in user account.

In this implementation, after receiving the binding request, the server can extract the fingerprint identifier from the binding request, and then bind the fingerprint identifier to the user account that is currently logged in to the client.

Optionally, after binding the fingerprint identifier to the currently logged-in user account, the server can further return a binding success notification to the client, and the client can further display a prompt page indicating a function provision success to the user.

In another example, for a biometric feature that cannot be verified by the terminal system such as a face image, an iris, and a sclera, the client can add the collected biometric feature to a binding request and send the binding request to the server. After receiving the binding request, the server can bind the biometric feature identifier of the biometric feature to the currently logged-in user account. The biometric feature identifier is generated by the server when the user enters the corresponding biometric feature. If the biometric feature carried in the binding request is not stored on the server, the server can generate a biometric feature identifier for the biometric feature, and bind the biometric feature identifier to the currently logged-in user account.

2. Service Implementation

Figure 4:
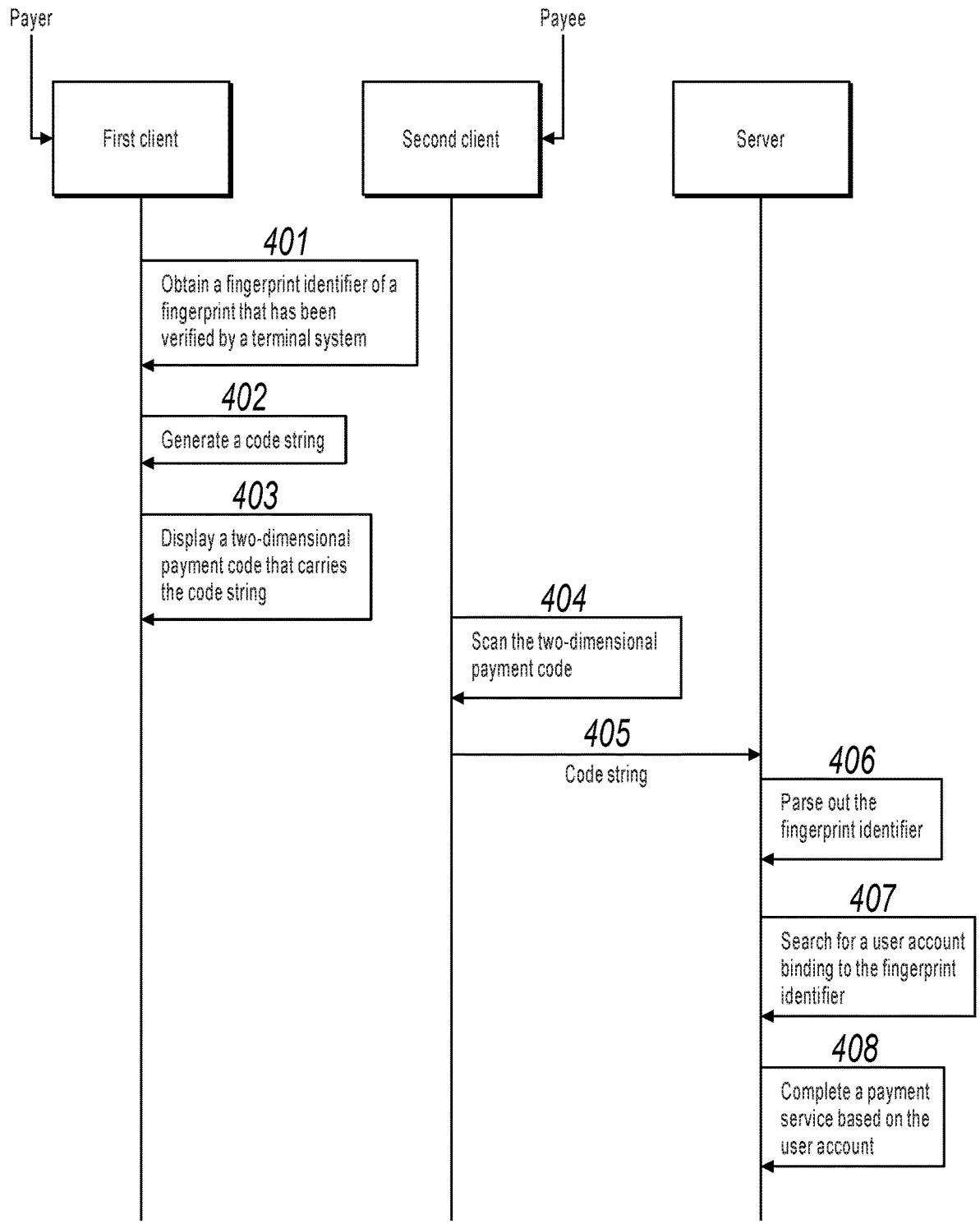
FIG. 4 is a schematic flowchart illustrating a method for service implementation, according to another example implementation of the present application.

Based on the implementation shown in FIG. 3, referring to FIG. 4, for example, a biometric feature is a fingerprint and a graphic code is a payment code. A process of using the payment code for payment can include the following steps:

Step 401: After receiving a display instruction of a payment code, a first client obtains a fingerprint identifier of a fingerprint that has been verified by a terminal system.

In this implementation, the first client is a client used by a payer. When making a payment to a payee (for example, a merchant), the payer can tap a "pay" button in the first client, and the first client can obtain the fingerprint identifier of the fingerprint that has been verified by the terminal system.

In this implementation, the first client can obtain the fingerprint identifier using the following two methods:

In an example, after receiving the display instruction of the payment code, the first client can invoke the terminal system to perform fingerprint verification on the user, and receive the fingerprint identifier of the fingerprint that is sent by the terminal system after the terminal system determines that the fingerprint of the user is verified.

As such, after the user taps the "pay" button, the first client can prompt the user to perform fingerprint verification. In addition, the first client can further invoke the terminal system to perform fingerprint verification on the user, for example, wake up a fingerprint sensor to collect the fingerprint of the user. After collecting the fingerprint entered by the user, the terminal system can verify whether the fingerprint is a fingerprint of an authorized user stored in the system. When the collected fingerprint is a valid fingerprint, the terminal system can return the fingerprint identifier of the fingerprint to the first client. When the collected fingerprint is not a valid fingerprint, the terminal system can return a verification failure notification to the first client, and the first client can further notify the user that the verification fails, or re-perform fingerprint verification.

In another example, after receiving the display instruction of the payment code, the first client can obtain a stored fingerprint identifier. The stored fingerprint identifier is a fingerprint identifier of a fingerprint used for unlocking the first client. After the first client enables a fingerprint unlocking function, the user can unlock the first client only after passing fingerprint verification, and then tap the "pay" button. In this process, after verifying that the unlocking fingerprint of the user is a valid fingerprint, the terminal system can send the fingerprint identifier of the valid fingerprint to the first client, and the first client stores the fingerprint identifier. Subsequently, after the user taps the "pay" button, the first client can obtain the stored fingerprint identifier. It is worthwhile to note that, in such an implementation, the first client can update the stored fingerprint identifier by using a fingerprint identifier sent by the terminal system when the user unlocks the first client next time, that is, the first client stores the fingerprint identifier of the current unlocking fingerprint.

Step 402: The first client generates a code string that carries the fingerprint identifier.

Figure 5:
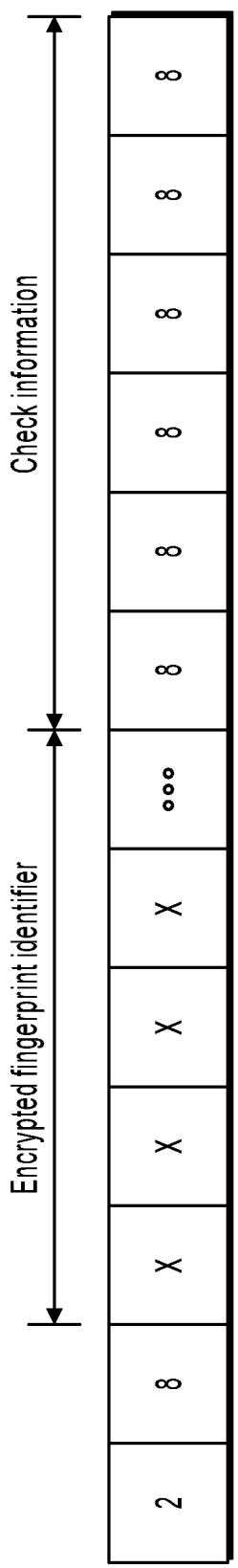
FIG. 5 is a schematic diagram illustrating a code string, according to an example implementation of the present application.

Based on step 401, after obtaining the fingerprint identifier, the first client can generate a code string. Referring to FIG. 5, FIG. 5 shows a format of a code string. The first two bits are identification information of the code string, the last six bits are check information of the code string, and the middle is an encrypted fingerprint identifier.

The first client can encrypt the obtained fingerprint identifier by using a predetermined algorithm, and add the encrypted fingerprint identifier to the location following the identification information of the code string. The check information is usually a check code generated based on the predetermined algorithm. For example, the check code can be a one-time password (OTP) code.

Step 403: The first client displays a two-dimensional payment code that carries the code string.

Step 404: A second client invokes a camera to scan the two-dimensional payment code.

In this implementation, the second client is a client used by the payee, and the payee can invoke a camera to scan the two-dimensional payment code using the second client.

Step 405: The second client sends the code string carried in the two-dimensional payment code to a server.

Step 406: The server parses out the fingerprint identifier from the code string.

Step 407: The server searches for a user account bound to the fingerprint identifier.

In this implementation, after receiving the code string, the server can parse out the encrypted fingerprint identifier and the check code. The server can decrypt the encrypted fingerprint identifier by using a predetermined algorithm, to obtain the fingerprint identifier, and then search for the user account binding to the fingerprint identifier. When the fingerprint identifier is not bound to any user account, the server can return payment failure prompt information to the second client. When the fingerprint identifier is bound to a user account, the server can further check the check code. If the check succeeds, step 408 can be performed. If the check fails, payment failure prompt information can be returned to the second client.

Step 408: Complete a payment service based on the user account.

It can be seen from the previous description that, when completing the payment service by using the two-dimensional payment code in the present application, the client can add the fingerprint identifier generated by the terminal system instead of the user account to the payment code. Even if an unauthorized person steals the payment code or the terminal device of the user, the unauthorized person cannot complete the payment operation because the fingerprint does not match, thereby ensuring property security of the user. In addition, because the two-dimensional payment code in the present application does not need to carry the user account, when the user does not log in to the user account, a payment operation can also be performed, which improves user experience.

Figure 6:
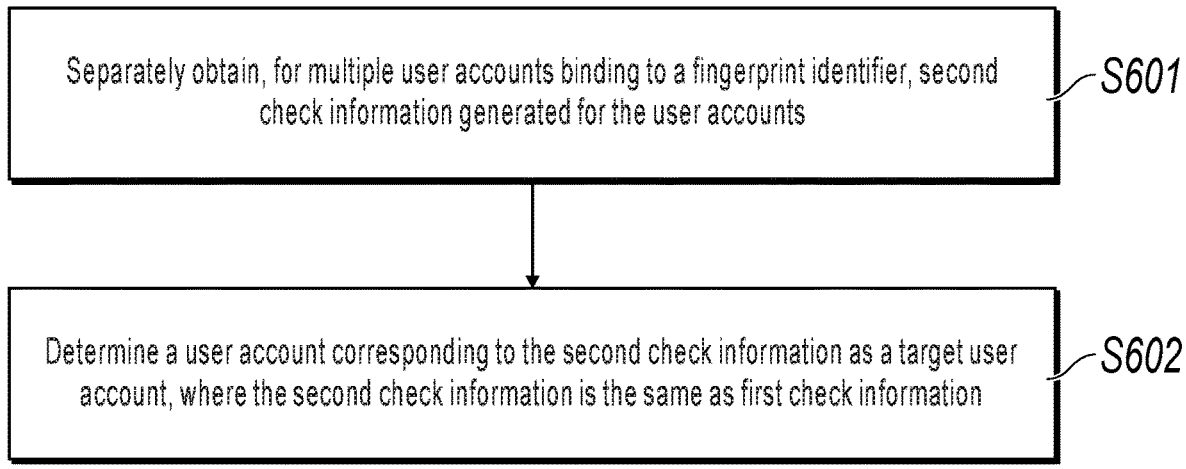
FIG. 6 is a schematic flowchart illustrating determining a target user account, according to an example implementation of the present application.

Optionally, in another example, because the fingerprint identifier is generated by the terminal system, and a same terminal system can be loaded onto different terminal devices, terminal systems of different user terminal devices can generate a same fingerprint identifier. For example, assume that User 1 uses ANDROID mobile phone 1, User 2 uses ANDROID mobile phone 2, an ANDROID operating system of ANDROID mobile phone 1 generates fingerprint identifier 1 for a fingerprint of User 1, and a fingerprint identifier generated by an ANDROID operating system of ANDROID mobile phone 2 for a fingerprint of User 2 can also be fingerprint identifier 1. When User 1 enables the payment function of adding a fingerprint identifier to the payment code to replace the user account, the server binds fingerprint identifier 1 to the account of User 1. When User 2 enables the payment function of adding a fingerprint identifier to the payment code to replace the user account, the server binds fingerprint identifier 1 to the account of User 2. Therefore, fingerprint identifier 1 is bound to two user accounts: the account of User 1 and the account of User 2. In this case, when determining that the fingerprint identifier is bound to multiple user accounts, the server can determine, from the multiple user accounts by using check information (for ease of differentiation, subsequently referred to as first check information) carried in a code string, the target user account for performing the payment service. Referring to FIG. 6, the server can determine the target user account by performing the following steps:

Step 601: Separately obtain, for multiple user accounts binding to a fingerprint identifier, second check information generated for the user accounts.

In this implementation, for example, the check information is an OTP code. A check rule of the OTP code is that the server and the client generate one unpredictable random code related to time every 60 seconds. For the same user account, the OTP codes generated by the server and the client are consistent and globally unique.

In this step, when finding that the fingerprint identifier is bound to multiple user accounts, the server can separately obtain a second OTP code (that is, second check information) generated for each user account.

Step 602: Determine a user account corresponding to second check information as the target user account, where the second check information is the same as the first check information.

In this implementation, the first OTP code (that is, the first check information) is an OTP code carried in the code string, and the server can sequentially compare the second OTP code with the first OTP code. When a second OTP code is the same as the first OTP code, the server can determine a user account corresponding to the second OTP code as the target user account, and subsequently complete the payment service based on the target user account.

For example, still assume that fingerprint identifier 1 is bound to two user accounts: the account of User 1 and the account of User 2, and the first OTP code carried in the code string is 123456. If the server learns that the second OTP code generated for the account of User 1 is 456123, and the second OTP code generated for the account of User 2 is 123456, the server can determine that the account of User 2 is the target user account and can further complete the payment service based on the account of User 2.

Optionally, in another example, for a biometric feature that cannot be verified by the terminal system such as a face image, an iris, or a sclera, in step 401, the first client can send the collected biometric feature to the server for verification. After confirming that the biometric feature is verified, the server can return the biometric feature identifier of the biometric feature to the first client, so the first client generates the code string in step 402. It is worthwhile to note that, in such an implementation, because biometric feature identifiers are generated by the server, the server can generate non-repeated biometric feature identifiers, and one biometric feature identifier will not be bound to multiple user accounts.

It is worthwhile to note that, the service implementation solution provided in the present application can be applied not only to the payment service, but also to other services, such as a virtual point consumption service, an electronic coupon consumption service, and a friend addition service. This is not specially limited in the present application. The friend addition service is used as an example. When displaying a two-dimensional code of user information, a client of User A can use a biometric feature identifier to replace user account 1 of User A. After scanning the two-dimensional code, User B can send the biometric feature identifier to the server, and after identifying user account 1 bound to the biometric feature identifier, the server can add User A as a friend of User B based on user account 1. In this process, the two-dimensional code does not carry any information about user account 1. Even if an unauthorized person steals the mobile phone of User A, no service operation can be performed because the biometric feature does not match, thereby ensuring security of user information.

Corresponding to the implementations of the previous method for service implementation, the present application further provides implementations of an apparatus for service implementation.

Figure 7:
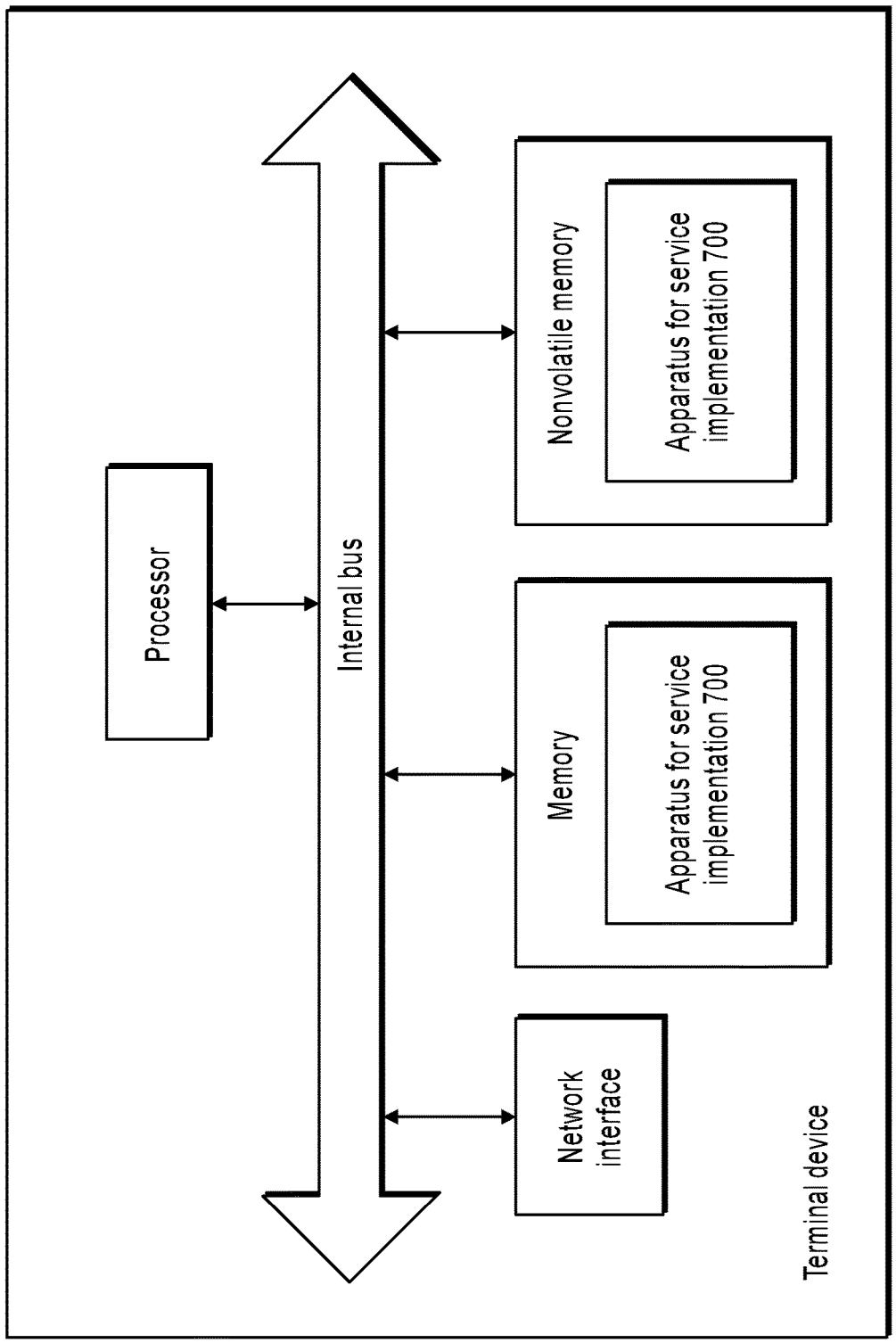
FIG. 7 is a schematic structural diagram illustrating an apparatus for service implementation, according to an example implementation of the present application.

Implementations of the apparatus for service implementation in the present application can be separately applied to a terminal device loaded with a client and a server. The apparatus implementation can be implemented by software, hardware, or a combination of hardware and software. Software implementation is used as an example. As a logical apparatus, the apparatus is formed by reading a corresponding computer program instruction in a non-volatile memory and running the instruction in a memory by a processor in apparatus for service implementation. In terms of hardware, FIG. 7 is a structural diagram illustrating hardware of a terminal device in which the apparatus for service implementation of the present application is located. In addition to the processor, the memory, the network interface, and the nonvolatile memory shown in FIG. 7, the terminal device that the apparatus is located in this implementation usually can include other hardware based on actual functions of the terminal device. Details are omitted here for simplicity.

Figure 8:
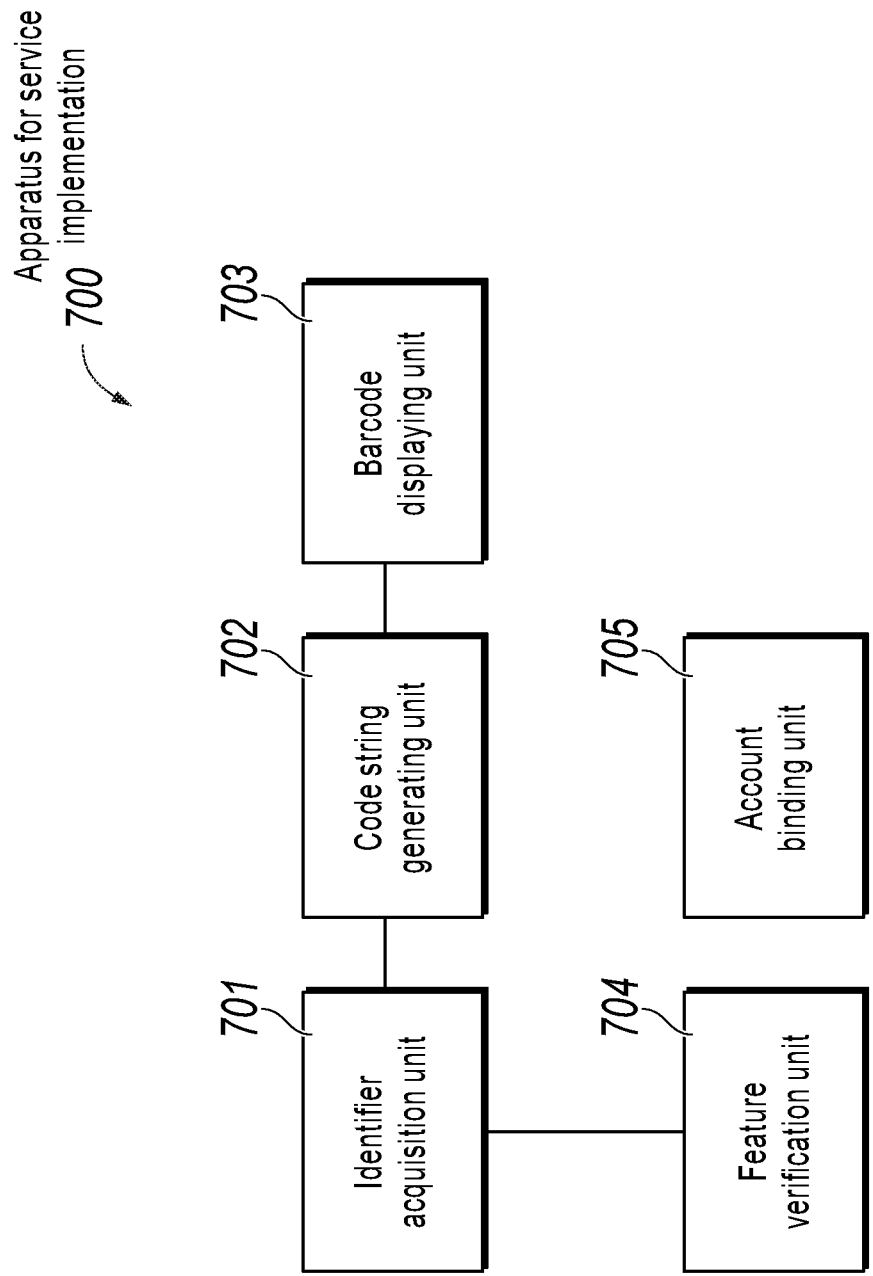
FIG. 8 is a block diagram illustrating an apparatus for service implementation, according to an example implementation of the present application.

FIG. 8 is a block diagram illustrating an apparatus for service implementation, according to an example implementation of the present application.

Referring to FIG. 8, the apparatus 700 for service implementation can be applied to the terminal device shown in FIG. 7, including an identifier acquisition unit 701, a code string generation unit 702, a barcode displaying unit 703, a feature verification unit 704, and an account binding unit 705.

The identifier acquisition unit 701 is configured to: after a display instruction of a graphic code is received, obtain a biometric feature identifier of a biometric feature that has been verified; the code string generation unit 702 is configured to generate a code string that carries the biometric feature identifier; and the barcode displaying unit 703 is configured to display a graphic code that carries the code string, so after scanning the graphic code, another terminal device sends the code string to a server, and the server identifies a binding user account based on the biometric feature identifier to complete related services.

Optionally, after receiving the display instruction of the graphic code, the identifier acquisition unit 701 collects a biometric feature entered by a user, and receives a biometric feature identifier of the biometric feature that is sent by a terminal system or the server after determining that the biometric feature is verified.

The feature verification unit 704 is configured to: if an APP that displays the graphic code needs to be unlocked by using a biometric feature before being enabled, collect a biometric feature of a user before the APP is enabled, verify the biometric feature, and after the verification succeeds, obtain the stored biometric feature identifier.

Optionally, the graphic code is a payment code or a collection code.

Optionally, the biometric feature includes a fingerprint, a palmprint, an iris, a sclera, and a face image.

Optionally, the related services include a payment service, a virtual point consumption service, an electronic coupon consumption service, and a friend addition service.

The account binding unit 705 is configured to: when the biometric feature identifier is being bound to the user account, in a login state of the user account, if the biometric feature is stored on a terminal device, send, to the server, a binding request that carries an identifier corresponding to the biometric feature, so the server binds the identifier corresponding to the biometric feature to the user account; and if the biometric feature is stored on the server, send a binding request to the server, so the server binds the identifier corresponding to the biometric feature to the user account.

Figure 9:
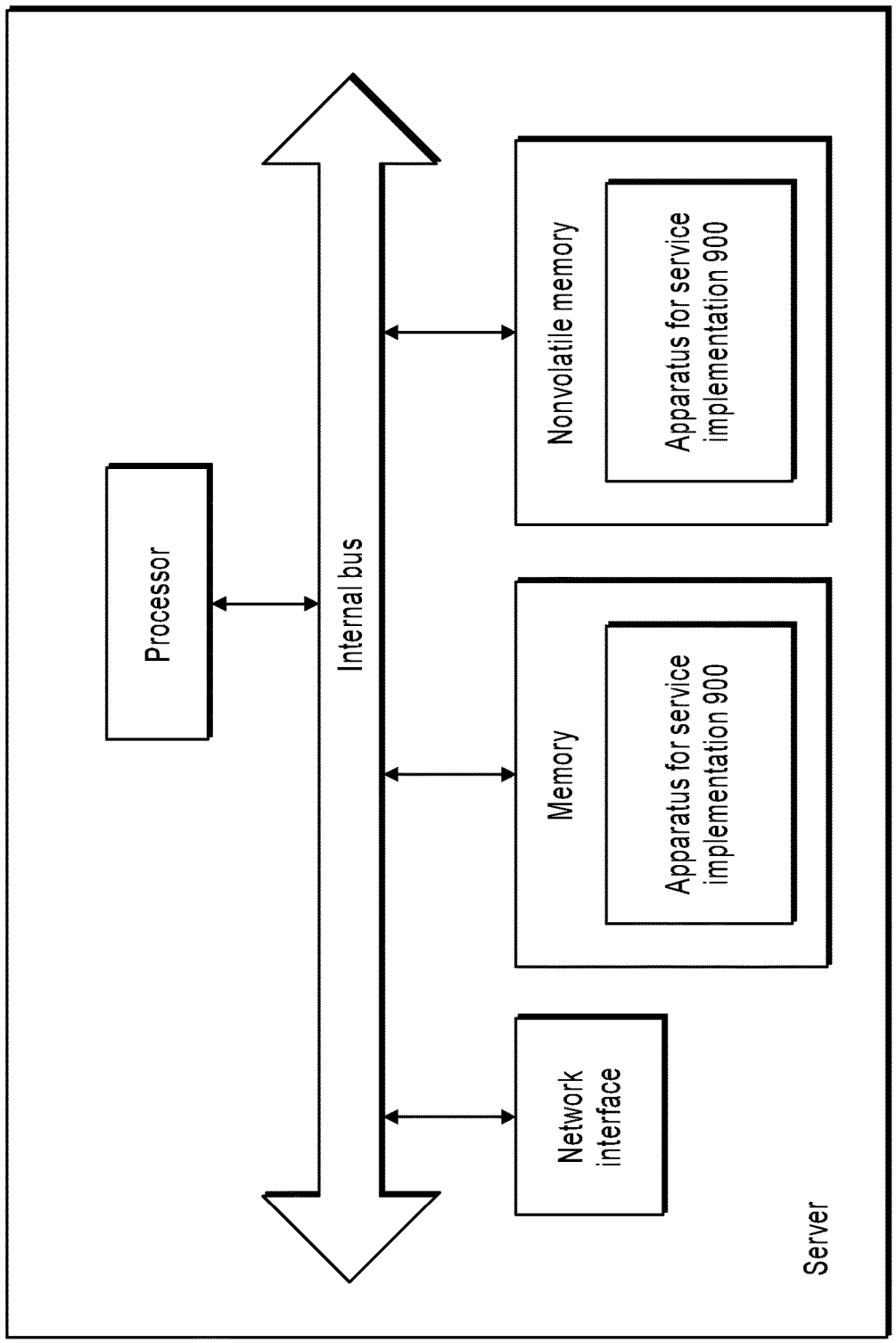
FIG. 9 is a schematic structural diagram illustrating another apparatus for service implementation, according to an example implementation of the present application.

In terms of hardware, FIG. 9 is a structural diagram illustrating hardware of the server that the apparatus for service implementation of the present application is located. In addition to the processor, the memory, the network interface, and the nonvolatile memory shown in FIG. 9, the server that the apparatus is located in this implementation usually can include other hardware based on actual functions of the server. Details are omitted here for simplicity.

Figure 10:
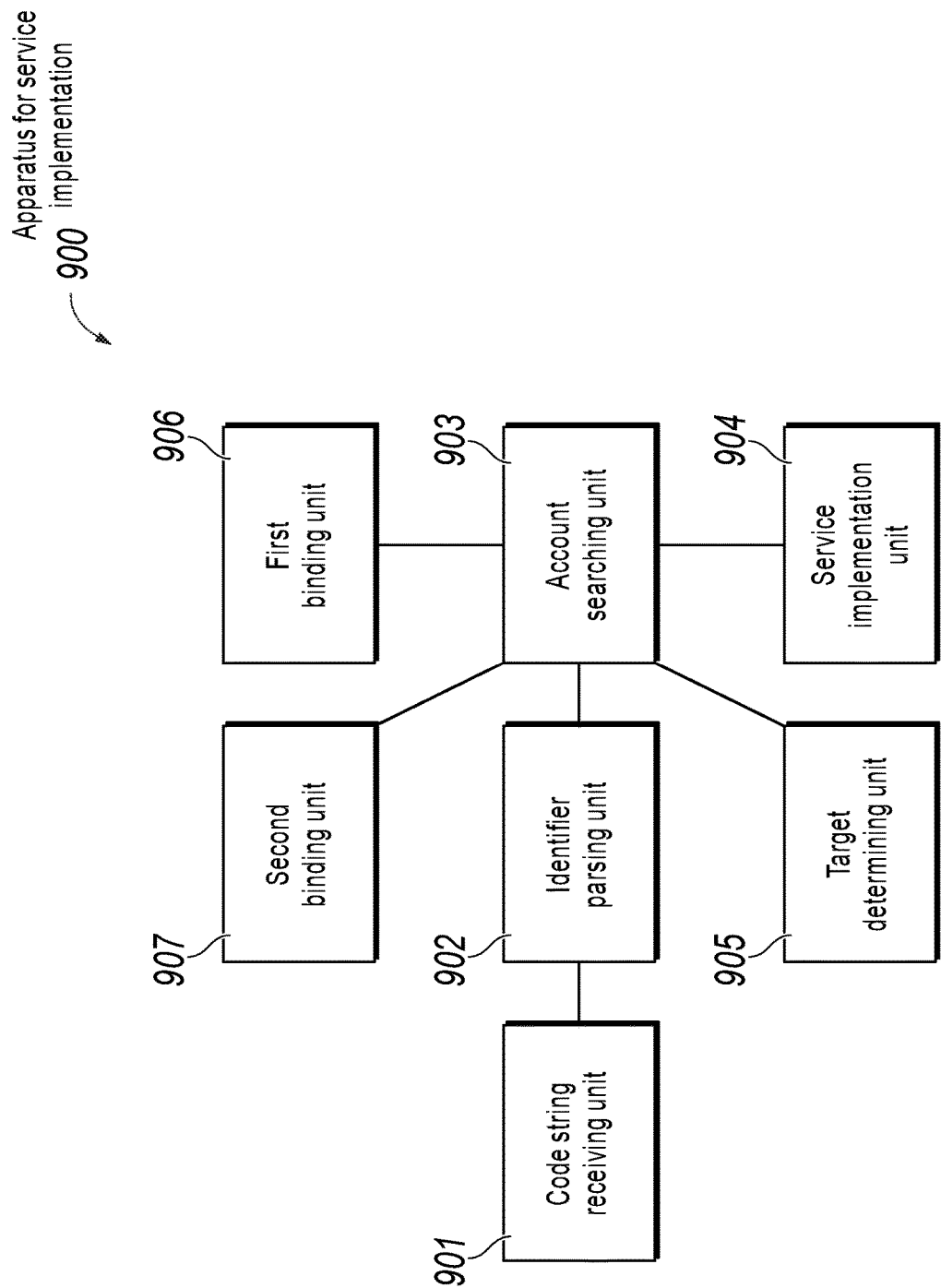
FIG. 10 is a block diagram illustrating another apparatus for service implementation, according to an example implementation of the present application.

FIG. 10 is a block diagram illustrating an apparatus for service implementation, according to an example implementation of the present application.

Referring to FIG. 10, the apparatus 900 for service implementation can be applied to the server shown in FIG. 9, including a code string receiving unit 901, an identifier parsing unit 902, an account searching unit 903, a service implementation unit 904, a target determining unit 905, a first binding unit 906, and a second binding unit 907.

The code string receiving unit 901 is configured to receive a code string sent by a client, where the code string is parsed out after a graphic code is scanned; the identifier parsing unit 902 is configured to parse out a biometric feature identifier from the code string; the account searching unit 903 is configured to search for a user account binding to the biometric feature identifier; and the service implementation unit 904 is configured to complete related services based on the user account.

The target determining unit 905 is configured to: when the biometric feature identifier is bound to multiple user accounts, determine a target user account from the multiple user accounts based on first check information carried in the code string, where the first check information is generated by the client; and the service implementation unit 904 is configured to complete the related services based on the target user account.

Optionally, the target determining unit 905 is configured to: separately obtain, for the multiple user accounts, second check information generated for the user accounts, and determine a user account corresponding to second check information as the target user account, where the second check information is the same as the first check information The first binding unit 906 is configured to receive a binding request sent by the client and carrying the biometric feature identifier, and bind the biometric feature identifier to a currently logged-in user account.

The second binding unit 907 is configured to receive an account binding request sent by the client and carrying a biometric feature, and bind a biometric feature identifier of the biometric feature to a currently logged-in user account.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts can or cannot be physically separate, and parts displayed as units can or cannot be physical units, can be located in one position, or can be distributed on a plurality of network units. Some or all of the modules or units can be selected based on actual needs to achieve the objectives of the solutions in the present application. A person of ordinary skill in the art can understand and implement the implementations of the present application without creative efforts.

The previous descriptions are merely examples of implementations of the present application, but are not intended to limit the present application. Any modification, equivalent replacement, or improvement made without departing from the spirit and principle of the present application should fall within the protection scope of the present application.

Figure 11:
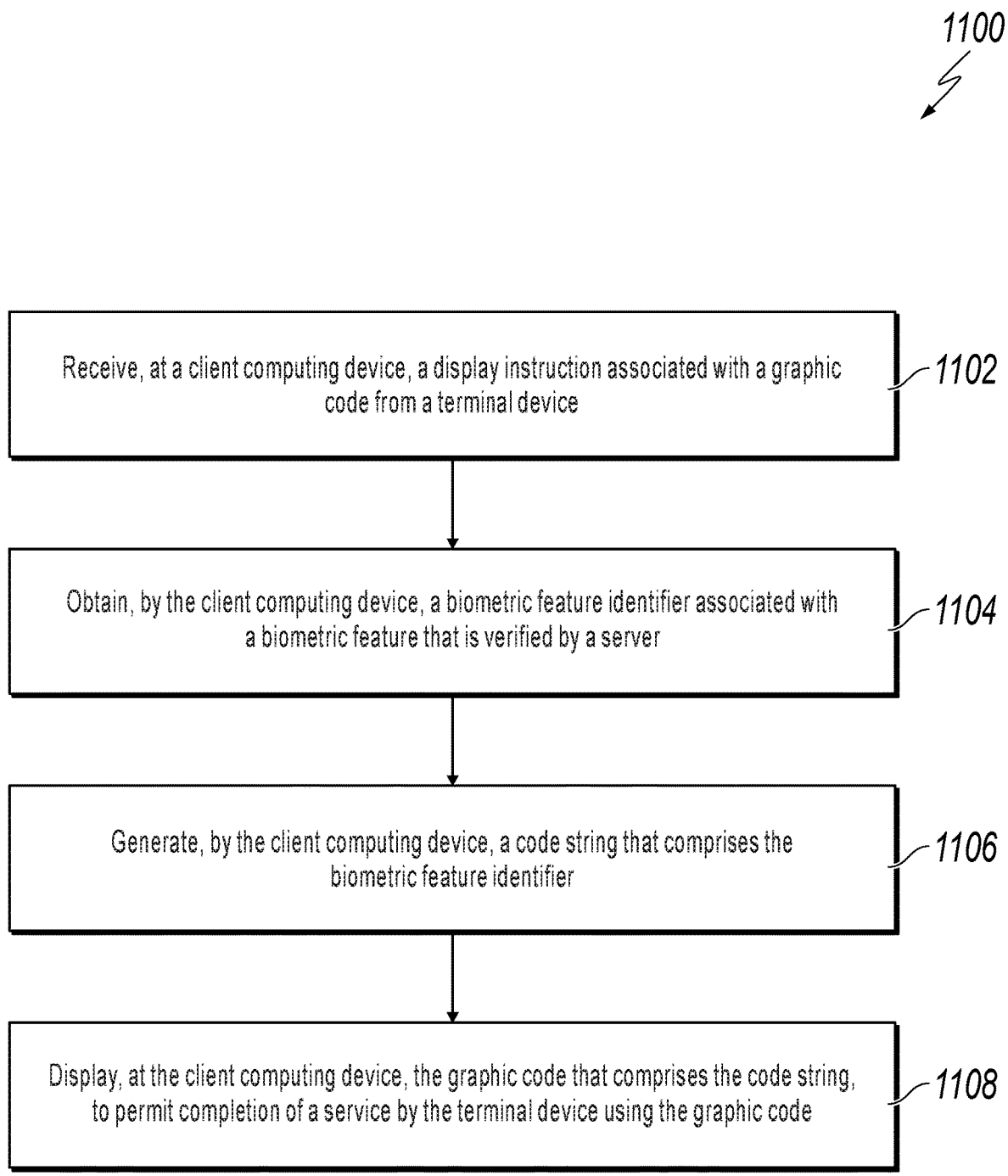
FIG. 11 is a flowchart illustrating an example of a computer-implemented method for implementing a service by using a graphic code, according to an implementation of the present disclosure.

FIG. 11 is a flowchart illustrating an example of a computer-implemented method 1100 for implementing a service by using a graphic code, according to an implementation of the present disclosure. For clarity of presentation, the description that follows generally describes method 1100 in the context of the other figures in this description. However, it will be understood that method 1100 can be performed, for example, by any system, environment, software, and hardware, or a combination of systems, environments, software, and hardware, as appropriate. In some implementations, various steps of method 1100 can be run in parallel, in combination, in loops, or in any order.

At 1102, a display instruction associated with a graphic code is received from a terminal device and at a client computing device (for example, the previously described client—such as a smartphone, tablet computer, or a laptop computer). From 1102, method 1100 proceeds to 1104.

At 1104, a biometric feature identifier associated with a biometric feature that is verified by a server is obtained by the client computing device. In some implementations, obtaining the biometric feature identifier includes collecting a biometric feature entered by a user and receiving the biometric feature identifier associated with the biometric feature entered by the user from the server after the server determines that the biometric feature entered by the user is verified. In some implementations, the biometric feature is at least one of a fingerprint, a palmprint, an iris, a sclera, and a face image. From 1104, method 1100 proceeds to 1106.

At 1106, a code string that includes the biometric feature identifier is generated by the client computing device. From 1106, method 1100 proceeds to 1108.

At 1108, the graphic code that includes the code string is displayed at the client computing device, to permit completion of a service by the terminal device using the graphic code.

In some implementations, method 1100 further includes, after displaying the graphic code at the client computing device, scanning the graphic code by the terminal device to retrieve the code string; and transmitting the code string to the server, where the server searches and identifies a user account to bind to the biometric feature identifier. In such implementations, binding the biometric feature identifier to the user account includes logging in, by the client computing device, to the user account; and transmitting, from the client computing device and to the server, a binding request that comprises the biometric feature identifier.

In some implementations, the biometric feature identifier is bound to a number of user accounts, where a target user account is determined from the plurality of user accounts based on first check information including the code string, and where the service is completed based on the target user account. In such implementations, where determining the target user account includes separately obtaining, for each of the plurality of user accounts, second check information; and determining, as the target user account, a user account that has the second check information that is as a same as the first check information. After 1108, method 1100 can stop.

Implementations of the present application can solve technical challenges in implementing services by using a graphic code, for example, a two-dimensional code. Through two-dimensional code scanning, information can be exchanged to implement related services. Traditionally, two-dimensional codes carries information that is necessary to complete related services of an authorized user, such as user account and user information. If an unauthorized person obtains the two-dimensional code, the user information can be leaked and used with the authorized user's account to make payments. These actions can cause reputational, financial, or other losses to the authorized user. Further, payment cannot be made through an APP using the two-dimensional code if the user has not logged into their account) and/or a user computing device executing the APP is in an offline state. What is needed is a technique to bypass these challenges in the traditional methods, and to provide a more secure and convenient method of making offline payment using a graphic code.

Implementation of the present application provide methods and apparatuses for implementing services, such as making a payment by using a graphic code. For example, prior to completing the payment service by using the two-dimensional payment code described in the present application, the client can add an identifier (such as fingerprint or other) generated by the terminal system (instead of the user account) to the payment code. The terminal system verifies the user identification using the identifier before allowing the payment service to be implemented. As such, even if an unauthorized person steals the payment code or the user computing device of the user, the unauthorized person cannot complete the payment operation because the identifier does not match, thereby ensuring security of the user's property. In addition, because the two-dimensional payment code does not need to carry the user account, and a payment operation can be performed even if the user does not log in to the user's account, which can improve user experience and flexibility of the described implementation of services.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:
1. A computer-implemented method, comprising:
   determining, by a first client computing device, that an authorized user is logged in using a user account to an application server executed on the first client computing device;

receiving, by the first client computing device, a biometric feature of an the authorized user of the first client computing device;
sending, by the first client computing device, to a terminal system the biometric feature;
receiving, by the terminal system, the biometric feature and verifying the biometric feature;
in response to verifying the biometric feature by the terminal system, generating a biometric feature identifier of the biometric feature;
receiving, by the first client computing device, from the terminal system, the biometric feature identifier;
sending, from the first client computing device, a binding request to the application server, wherein the binding request includes a request to bind the biometric feature identifier generated by the terminal system to the user account;
sending, from the first client computing device, and to a second client computing device, a request to complete a service without the authorized user being logged in to the application server;
receiving, at the first client computing device, and from the second client computing device, an instruction to display a graphic code;
in response to receiving the instruction to display the graphic code, receiving, by the first client computing device, the biometric feature of the authorized user of the first client computing device;
verifying, by the terminal system, the biometric feature;
in response to verifying the biometric feature, providing, by the terminal system, the biometric feature identifier associated with the biometric feature to the first client computing device;
generating, by the first client computing device, a code string that comprises the biometric feature identifier, wherein the code string does not include any user account information; and
displaying, at the first client computing device, a generated graphic code that comprises the code string.

2. The computer-implemented method of claim 1, wherein the biometric feature is at least one of a fingerprint, a palmprint, an iris, a sclera, and a face image.

3. The computer-implemented method of claim 1, further comprising:
after displaying the generated graphic code at the first client computing device, scanning the graphic code, by the second client computing device, to retrieve the code string; and
transmitting, by the second client computing device, the code string to the application server, wherein the application server searches and identifies the user account previously bound to the biometric feature identifier.

4. The computer-implemented method of claim 3, wherein the biometric feature identifier is bound to a plurality of user accounts, wherein a target user account is determined, by the application server, from the plurality of user accounts based on first check information comprising the code string, and wherein the service is completed based on the target user account.

5. The computer-implemented method of claim 4, wherein determining the target user account comprises:
separately obtaining, by the application server, for each of the plurality of user accounts, second check information; and
determining, by the application server, as the target user account, a user account where the second check information matches the first check information.

6. A system comprising:
a non-transitory, computer-readable medium of a first client computing device storing one or more instructions of the first client computing device, when executed by one or more processors of the first client computing device, cause the one or more processors of the first client computing device to perform operations comprising:
determining that an authorized user is logged in using a user account to an application server executed on the first client computing device;
receiving a biometric feature of the authorized user of the first client computing device;
sending the biometric feature to a terminal system;
receiving a biometric feature identifier from the terminal system;
sending a binding request to the application server, wherein the binding request includes a request to bind the biometric feature identifier generated by the terminal system to the user account;
sending to a second client computing device, a request to complete a service without the authorized user being logged in to the application server;
receiving, from the second client computing device, an instruction to display a graphic code;
in response to receiving the instruction to display the graphic code, receiving the biometric feature of the authorized user of the first client computing device;
generating a code string that comprises the biometric feature identifier, wherein the code string does not include any user account information; and
displaying a generated graphic code that comprises the code string; and
a non-transitory, computer-readable medium of the terminal system storing one or more instructions of the terminal system, when executed by one or more processors of the terminal system, cause the one or more processors of the terminal system to perform operations comprising:
receiving the biometric feature from the first client computing device and verifying the biometric feature;
in response to verifying the biometric feature by the terminal system, generating the biometric feature identifier of the biometric feature;
verifying the biometric feature in response to receiving the biometric feature when the authorized user is not logged into the application server; and
in response to verifying the biometric feature, providing the biometric feature identifier associated with the biometric feature to the first client computing device; and
a non-transitory, computer-readable medium of the application server storing one or more instructions of the application server, when executed by one or more processors of the application server, cause the one or more processors of the application server to perform operations comprising:
receiving the binding request from the first client computing device; and
a non-transitory, computer-readable medium of the second client computing device storing one or more instructions of the second client computing device, when executed by one or more processors of the second client computing device, cause the one or more processors of the second client computing device to perform operations comprising:

receiving the request to complete the service from the first client computing device; and
sending the instruction to display the graphic code to the first client computing device.

7. The system of claim 6, wherein the biometric feature is at least one of a fingerprint, a palmprint, an iris, a sclera, and a face image.

8. The system of claim 6, wherein the one or more instructions of the second client computing device, when executed by the one or more processors of the second client computing device, further cause the one or more processors of the second client computing device to perform the operations comprising:
scanning the graphic code to retrieve the code string; and
transmitting the code string to the application server, wherein the one or more instructions of the application server, when executed by the one or more processors of the application server further cause the one or more processors of the application server to perform operations comprising, searching and identifying the user account previously bound to the biometric feature identifier.

9. The system of claim 8, wherein the one or more instructions of the application server, when executed by the one or more processors of the application server further cause the one or more processors of the application server to perform the operations comprising: determining a target user account from the a plurality of user accounts based on first check information comprising the code string, and wherein the service is completed based on the target user account.

10. The system of claim 9, wherein the one or more instructions of the application server, when executed by the one or more processors of the application server further cause the one or more processors of the application server to perform the operations comprising:
separately obtaining, for each of the plurality of user accounts, second check information; and
determining, as the target user account, a user account where the second check information matches the first check information.

11. A computer-implemented system, comprising:
a first client computing device comprising a first client computing device processor and a memory device of the first client computing device storing instructions of the first client computing device, when executed by the first client computing device processor, cause the first client computing device processor to perform one or more operations comprising:
determining that an authorized user is logged in using a user account to an application server executed on the first client computing device;
receiving a biometric feature of the authorized user of the first client computing device;
sending the biometric feature to a terminal system;
receiving a biometric feature identifier from the terminal system;
sending a binding request to the application server, wherein the binding request includes a request to bind the biometric feature identifier generated by the terminal system to the user account;
sending to a second client computing device, a request to complete a service without the authorized user being logged in to the application server;
receiving, from the second client computing device, an instruction to display a graphic code;
in response to receiving the instruction to display the graphic code, receiving the biometric feature of the authorized user of the first client computing device;
generating a code string that comprises the biometric feature identifier, wherein the code string does not include any user account information; and
displaying a generated graphic code that comprises the code string; and
the terminal system, comprising a terminal system processor and a memory device of the terminal system storing instructions of the terminal system that, when executed by the terminal system processor, cause the terminal system processor to perform one or more operations comprising:
receiving the biometric feature from the first client computing device and verifying the biometric feature;
in response to verifying the biometric feature by the terminal system, generating the biometric feature identifier of the biometric feature;
verifying the biometric feature in response to receiving the biometric feature when the authorized user is not logged into the application server; and
in response to verifying the biometric feature, providing the biometric feature identifier associated with the biometric feature to the first client computing device; and
the application server, comprising an application server processor and a memory device of the application server storing instructions of the application server that, when executed by the application server processor, cause the application server processor to perform one or more operations comprising:
receiving the binding request from the first client computing device.

12. The computer-implemented system of claim 11, wherein the biometric feature is at least one of a fingerprint, a palmprint, an iris, a sclera, and a face image.

13. The computer-implemented system of claim 11, further comprising:
the second client computing device comprising a second client computing device processor and a memory device of the second client computing device storing instructions of the second client computing device that, when executed by the second client computing device processor, cause the second client computing device processor to perform the one or more operations comprising:
receiving the request to complete the service from the first client computing device;
sending the instruction to display the graphic code to the first client computing device;
after displaying the generated graphic code at the first client computing device, scanning the graphic code to retrieve the code string; and
transmitting the code string to the application server, wherein the application server processor searching and identifying the user account previously bound to the biometric feature identifier.

14. The computer-implemented system of claim 13, wherein the biometric feature identifier is bound to a plurality of user accounts, wherein a target user account is determined, by the application server processor, from the plurality of user accounts based on first check information comprising the code string, and wherein the service is completed based on the target user account.

15. The computer-implemented system of claim 14 further comprising, wherein determining the target user account comprises:

separately obtaining, by the application server processor, for each of the plurality of user accounts, second check information; and determining, by the application server processor, as the target user account, a user account where the second check information matches the first check information.

\* \* \* \* \*

UNITED STATES PATENT AND TRADEMARK OFFICE
CERTIFICATE OF CORRECTION

PATENT NO. : 10,922,677 B2
APPLICATION NO. : 16/395961
DATED : February 16, 2021
INVENTOR(S) : Yitao Song Page 1 of 1

It is certified that error appears in the above-identified patent and that said Letters Patent is hereby corrected as shown below:

In the Claims

In Column 15, Line 2, Claim 1, delete "an the" and insert -- the --, therefor.

In Column 17, Line 15, Claim 8, delete "transmitting" and insert -- transmitting, --, therefor.

In Column 17, Line 29, Claim 9, delete "the a" and insert -- a --, therefor.

In Column 18, Line 55, Claim 13, delete "code" and insert -- code, --, therefor.

In Column 18, Line 57, Claim 13, delete "transmitting" and insert -- transmitting, --, therefor.

In Column 19, Lines 1-2, Claim 15, delete "claim 14 further comprising" and insert -- claim 14 --, therefor.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*